Inventor:
Ralph R. Randall.

Patented Feb. 29, 1944

2,342,755

UNITED STATES PATENT OFFICE 2,342,755

NONEQUALIZING DIFFERENTIAL TRANSMISSION

Ralph R. Randall, Freeport, Ill.

Application November 26, 1942, Serial No. 466,984

5 Claims. (Cl. 74—313)

My invention relates to a nonequalizing differential gearing which provides greater safety for automotive vehicles because of a new action in power transmission.

It has been found in practice that the conventional differential is too efficient in equalization. It differentiates not only for unequal wheel velocities as in turning a corner, but causes the power to flow to the wheel of least resistance as occurs with unequal traction conditions, such as icy pavements, muddy soft shoulders, etc.

From the standpoint of performance and safety the conventional differential leaves much to be desired. With unequal traction, the engine power flows to the wheel having the lesser traction. This constant changing of traction from one wheel to the other and then to both, causes irregular power flow with resultant danger of side-slip, swaying and skidding. It is this condition more so than "unequalized brakes" that causes motor vehicles to slip out of control, especially with bad highway and road conditions.

One of the objects of my invention is to provide a nonequalizing differential gearing which will be useful in automotive transmissions which under ordinary conditions will transmit torque from the propeller shaft equally to two drive axles, but which is so designed that if one of the drive wheels slips for lack of traction, all or a major proportion of the torque will be transmitted to the nonslipping wheel and in which a relatively long torque radius is provided in the gears secured to the axles.

A further object of my invention is to provide such a construction which will have relatively few parts, which will be easy to assemble and in which use is made of a large part of the present standard gear construction in automotive differentials.

Further objects and advantages will appear from the specification and claims.

In the drawing, in which two forms of my invention are shown,

Figure 1:
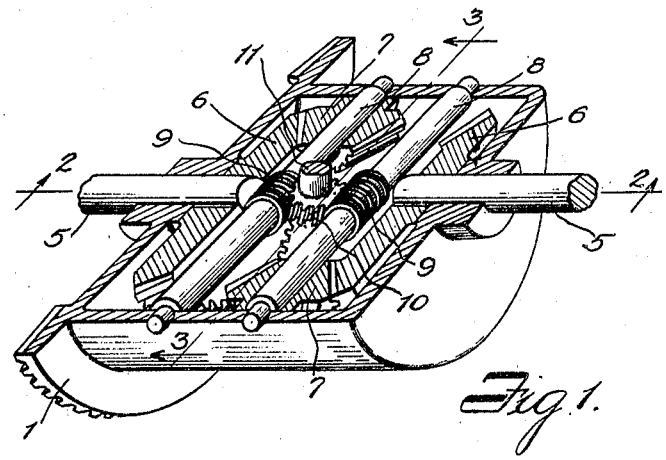
Figure 1 is a sectional perspective view of a nonequalizing differential.
Figures 2, 3:
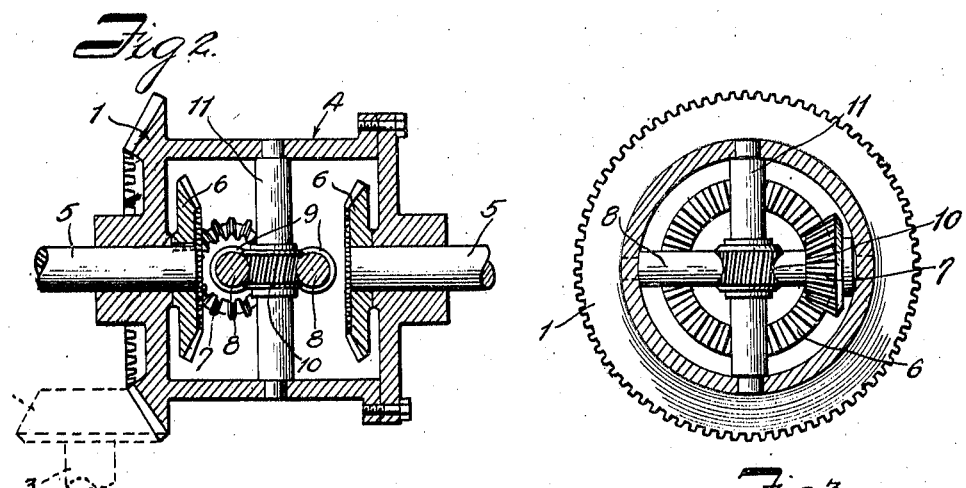
Fig. 2 is a section substantially on the line 2—2 of Fig. 1.
Fig. 3 is a section substantially on the line 3—3 of Figs. 1 and 2.

Referring first to Figs. 1, 2, and 3, the construction shown comprises a bevel gear 1 which may be driven from a bevel pinion 2 on the usual propeller shaft 3, a gear carrier 4 to which this gear 1 is secured, a pair of axles 5 mounted for relative rotation with respect to the gear carrier 4, a pair of bevel gears 6, one splined on each axle 5, a pair of bevel pinions 7, one meshing with each of the pair of bevel gears 6, a pair of shafts 8 rotatably mounted in the gear carrier 4 on which the bevel pinions 7 are fixedly secured, a pair of worms 9 rotatable with the shafts 8, respectively, a worm gear 10 meshing with both worms, and a shaft 11 on which the worm gear 10 is mounted having its ends mounted in the gear carrier 4.

In use, if the vehicle is being driven in a straight line and there is no slippage between the tires and the roadway, the torque from the propeller shaft 3 will be transmitted equally to the two axles 5 and there will be no relative rotation between the two axles, the torque being transmitted from the bevel pinion 2 through the bevel gear 1 to the cross shaft 11 on which the worm gear 10 is mounted. The resisting countertorque from each of the axles 5 acts through the bevel gear 6, bevel pinion 7 and worm 9 to exert a counter-rotational force on the corresponding worm shaft 8, but as there is resisting countertorque on both of the axles the torque from the propeller shaft will be transmitted equally to the two axles.

In case, due to the slippery condition of the roadway, or for any other reason, the resisting countertorque on one of the axles should become such that the tractive effect of one of the wheels becomes negligible or very small, all, or the major portion, of the torque will be transmitted to the axle in which the resisting countertorque is still effective, due to the substantially irreversible or at least nonequalizing effect of the pitch of the threads of the worm gearing, the pitch being such that the gearing is either substantially irreversible or at least so steep that very little power will be transmitted when the worm gear is attempting to drive the worm. It has been found that on a nonequalizing differential the motive power can not cause one wheel to precess while the other wheel remains stationary as is the case with the present ordinary equalizing differential. When the vehicle is turned from a straight path, then one driving wheel travels faster than the other. This causes a release of countertorque on the driving axles 5 because of counter-rotation of the worms 9, thus permitting easy differentiation.

It will be noted that the bevel pinion 2, bevel gear 1, the two axle bevel gears 6, and the two bevel pinions 7 meshing therewith may be substantially the same as those used in the ordinary equalizing differential gearing. It will also be noted that the pitch diameter of the axle bevel gears 6 is comparatively large, thus giving a relatively large torque radius which may be substantially the same as the torque radius used for these gears in present standard practice.

Figure 4:
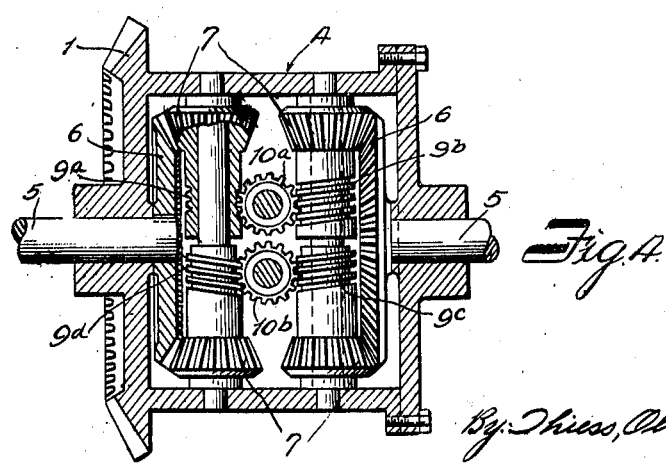
Fig. 4 is a sectional view similar to the section shown in Fig. 1 but showing a different form of gearing.

In Fig. 4 the construction is similar to that previously described, except that here two bevel pinions 7 are provided for each of the axle bevel gears, each bevel pinion being provided with its individual worm 9a, 9b, 9c, and 9d and two worm gears 10a and 10b being provided, each meshing with a pair of worms. In the construction of Figs. 1, 2, and 3, the direction of thread of the worms 9 is the same, whereas in the construction of Fig. 4 the direction of thread of the worm 9a is the reverse of that of the worm 9b, and the direction of thread of the worm 9c is the reverse of that of the worm 9d.

It will be seen that the pitch of worms in Fig. 4 is such that the endwise force or thrust acting on the bevel pinions 7 due to their coaction with the bevel gears 6 is in the opposite direction from the end force or thrust on these bevel pinions due to the coaction of the worm gearing so that these end thrusts tend to balance each other and minimize the total end thrust enabling the use of comparatively simple and inexpensive end thrust bearings.

While I have shown the gears 6 and 7 as bevel gears, it is possible that other types of gear might be used, such as helical hypoid gears, or the like, still retaining the relatively large pitch diameter of the gears 6 and the transverse axes of the gears 7.

Further modifications will be apparent to those skilled in the art and it is desired, therefore, that the invention be limited only by the scope of the appended claims.

Having thus described my invention, what I claim and desire to secure by Letters Patent is:

1. A nonequalizing differential comprising a pair of rotatable substantially coaxially mounted traction drive elements, a pair of gears, one secured to each element and coaxial therewith, a pair of pinions, one meshing with each gear, the axes of said pinions being transverse to the axis of said elements, a pair of worm gearing elements, one rotatable with each pinion, a worm gearing element lying between and meshing with both worm gearing elements of said pair, and a gear carrier rotatable about the axis of said drive elements on which said pinions and worm gearing elements are mounted.

2. A nonequalizing differential comprising a pair of rotatable substantially coaxially mounted traction drive elements, a pair of bevel gears, one secured to each element and coaxial therewith, a pair of bevel pinions, one meshing with each bevel gear, the axes of said bevel pinions being transverse to the axis of said elements, a pair of worms, one rotatable with each bevel pinion, a worm gear lying between and meshing with both worms, and a gear carrier rotatable about the axis of said elements on which said bevel pinions, worms, and worm gear are mounted.

3. A nonequalizing differential comprising a pair of rotatable substantially coaxially mounted traction drive elements, a pair of gears, one secured to each element and coaxial therewith, two pairs of pinions, one pair meshing with each gear, the axes of said pinions being transverse to the axis of said elements, two pairs of worms, one rotatable with each bevel pinion, two worm gears each lying between and meshing with a worm of both pairs, and a gear carrier rotatable about the axis of said elements on which said pinions, worms, and worm gears are mounted.

4. A nonequalizing differential comprising a pair of rotatable substantially coaxially mounted traction drive elements, a pair of bevel gears, one secured to each element and coaxial therewith, two pairs of bevel pinions, one pair meshing with each bevel gear, the axes of said bevel pinions being transverse to the axis of said elements, two pairs of worms, one rotatable with each bevel pinion, two worm gears, each lying between and meshing with a worm of both pairs, and a gear carrier rotatable about the axis of said elements on which said bevel pinions, worms, and worm gears are mounted.

5. A nonequalizing differential comprising a pair of rotatable substantially coaxially mounted traction drive elements, a pair of bevel gears, one secured to each element and coaxial therewith, two pairs of bevel pinions, one pair meshing with each bevel gear, the axes of said bevel pinions being transverse to the axis of said elements, two pairs of worms, one rotatable with each bevel pinion, two worm gears, each meshing with a worm of both pairs, and a gear carrier rotatable about the axis of said elements on which said bevel pinions, worms, and worm gears are mounted, the pitch of the threads of the worms and worm gear being such that the end thrust on the worms due to the coaction of the worms and worm gear will be in the opposite direction to the end thrust on the worms due to the coaction of the bevel gears and bevel pinions.

RALPH R. RANDALL.